United States Patent [19]

Dion

[11] Patent Number: 4,580,048

[45] Date of Patent: Apr. 1, 1986

[54] SYSTEM FOR MEASURING THE NATURAL GAMMA RADIATION OF SURFACE AND SUBSURFACE FORMATIONS

[75] Inventor: Eric P. Dion, Dallas, Tex.

[73] Assignee: Mobil Oil Corporation, New York, N.Y.

[21] Appl. No.: 528,359

[22] Filed: Aug. 31, 1983

[51] Int. Cl.⁴ ............................................. G01V 5/00
[52] U.S. Cl. ............................................... 250/256
[58] Field of Search ..................... 250/255, 256, 261

[56] References Cited

U.S. PATENT DOCUMENTS 3,922,541 11/1975 Seeman .............................. 250/256
4,450,354 5/1984 Smith, Jr. et al. ................. 250/256

Primary Examiner—Janice A. Howell
Attorney, Agent, or Firm—A. J. McKillop; Michael G. Gilman; George W. Hager, Jr.

[57] ABSTRACT

A natural gamma radiation measuring system includes a gamma ray detector and a multichannel analyzer for recording a full gamma-ray energy spectrum. An artificial source of gamma radiation that is temperature insensitive provides a known level of gamma radiation which is utilized by the multichannel analyzer to provide gain stabilization for the full energy spectrum output of the gamma ray detector.

4 Claims, 2 Drawing Figures

SYSTEM FOR MEASURING THE NATURAL GAMMA RADIATION OF SURFACE AND SUBSURFACE FORMATIONS

BACKGROUND OF THE INVENTION

This invention relates to a system for measuring the natural gamma radiation of surface and subsurface formations.

Various methods and apparatus have been utilized in the well logging art to study the radioactive properties of subsurface formations, both where the radioactivity is natural and where it is artifically induced. Logs of such properties aid in the study of the nature of the subsurface formations, particularly in exploration for minerals and hydrocarbon deposits. Certain elements in the subsurface formations exhibit distinctive properties which are measurable in situ. Of the many elements that occur, potassium (K), uranium (U), and thorium (Th) are important natural sources of gamma radiation. Each of these elements either contains or radioactively decays to, radioactive isotopes which emit gamma radiation at characteristic energy levels. The neutral gamma-ray spectrum of a given formation therefore exhibits peaks of intensity at energies corresponding to the potassium, uranium, and thorium content of the formation.

In U.S. Pat. No. 3,940,610 to Dennis et al, a borehole logging system employs a gamma-ray detector for measuring the total natural gamma radiation within the borehole. Three energy band selectors discriminate this measurement of the gamma-ray detector into potassium, uranium, and thrium energy band signals centered about the energy levels at which potassium, uranium, and thorium exhibit peak gamma radiation intensities.

These potassium, uranium, and thorium energy band signals are then applied to a stripping unit having potassium and uranium channels. The potassium channel strips the potassium gamma radiation measurement, as represented by the potassium energy band signal, of the influence from the gamma radiation from uranium and thorium, Further, the uranium channel strips the uranium gamma radiation measurement, as represented by the uranium energy band signal, of the influence from the gamma radiation from thorium.

For a further discussion on the applications of field gamma-ray spectrometry as a geological mapping and exploration tool reference may be had to an article entitled "Techniques of field gamma-ray spectrometry" in the *Mineralogical Magazine,* December 1981, Vol. 44.

SUMMARY OF THE INVENTION

The present invention is directed to a system for measuring natural gamma radiation of potassium, uranium and thorium. Such system includes a gamma-ray detector and a multichannel analyzer for recording the full energy spectrum output from the gamma-ray detector. An artificial source of gamma radiation provides a gamma-ray energy output that is temperature insensitive and does not interfere, with the energy peaks from the measured potassium, uranium and thorium gamma radiation. The artificial source of gamma radiation is positioned so as to permit measurement of the artificial gamma radiation by the detector at the same time as the measurement of the natural gamma radiation. The multichannel analyzer records the full energy spectrum output of said detector and gain stabilizes the full energy spectrum on the energy level of the artificial source of gamma radiation.

The artificial source of gamma radiation has an energy level peak below the energy range of the natural gamma radiation. Both the natural and artificial gamma radiation measurements are amplified and applied to the multichannel analyzer which examines the channels on either side of the energy peak from the artificial source and adjusts the gain of the gamma-ray detector to provide a gain stabilized full energy spectrum for said natural gamma radiation.

In a further aspect of the invention the presence of potassium, uranium and thorium is identified by performing a channel-by-channel least squares fit of the measured full energy spectrum from the multichannel analyzer to a standard energy spectrum recorded from known amounts of potassium, uranium and thorium.

DESCRIPTION OF THE PREFERRED EMBODIMENT

Figure 1:
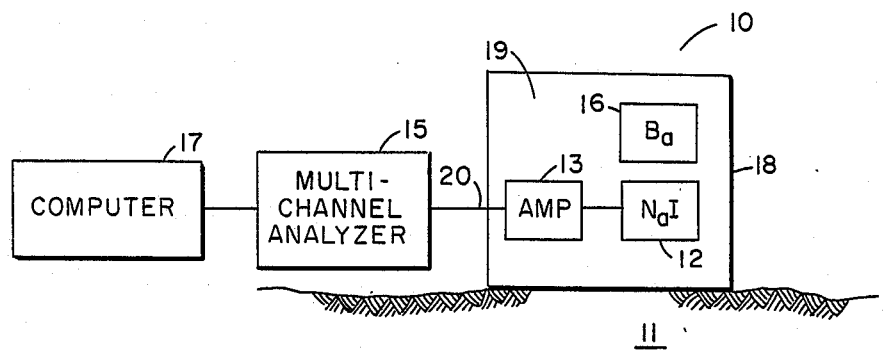
FIG. 1 illustrates the natural gamma radiation measuring system of the present invention.
Figure 2:
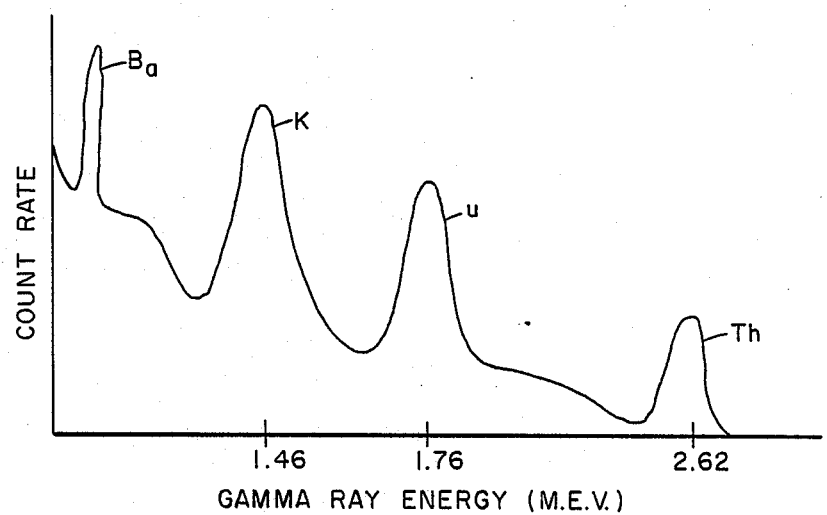
FIG. 2 illustrates the natural gamma radiation spectrum of the radioactive elements to be measured by the system of FIG. 1.

Referring now to FIG. 1, a gamma-ray detector 10 measures the natural gamma radiation emitted by the formation 11. The gamma-ray detector includes a scintillation type detector 12 (e.g. a crystal of sodium iodide activated with thallium) which cooperates with power supply and pre-amplifier 13. The gamma-ray spectrum recorded by detector 10 is applied to the multichannel analyzer 15 which records the entire gamma-ray spectrum from 200 Kev to 3.5 Mev, such a recording being illustrated in FIG. 2. Gamma-ray energy peaks are illustrated for potassium, uranium and thorium centered about 1.46 Mev, 1.76 Mev and 2.62 Mev respectively. Centered about 356 Kev is a barium-133 energy peak provided by means of the barium-133 gain stabilization source 16 located in the detector 10. This barium source products a known level of gamma radiation that is recorded by detector 10 and is utilized by the multichannel analyzer 15 to provide gain stabilization to the detector 10. More particularly, gamma radiation output of detector 10 is responsive to temperature changes in the field. Such temperature changes move the energy peak outputs of detector 10 for potassium, uranium and thorium. The barium-133 source is, however, not temperature sensitive and therefore produces artificial gamma radiation with a stabilized energy peak under variable environmental conditions. The multichannel analyzer 15 looks at channels on either side of the barium-133 energy peak and adjusts the gain of the pre-amplifier 13 to maintain a gain stabilized energy spectrum over the full energy spectrum. Barium-133 is one example of an energy source which is useful for gain stabilization purposes. Any suitable energy source that is not temperature sensitive and does not interfere with the natural radioactivity spectrum from potassium, uranium and thorium within a formation may be used. In this manner the full natural gamma radiation energy spectrum is recorded for processing in contrast to single channel recording (with its inherent stripping requirement) for each of the natural gamma radiation components of potassium, uranium and thorium as shown in the aforementioned U.S. patent to Dennis et al.

The recorded full energy spectrum of the field natural gamma radiation measurement is applied from the multichannel analyzer 15 to the computer 17 which fits this measured spectrum to a standard full energy spectrum recorded from known amounts of potassium, uranium and thorium gamma radiation by a least squares fit. This least squares fit may be carried out use of the ND6600 Computer and the ND6600 NAI Data Reduction Program Package supplied by Nuclear Data, Inc. This program package determines the activities of potassium, uranium and thorium over the full energy spectrum. A channel by channel comparison is carried out between the field measured full energy spectrum and a standard full energy spectrum. It determines gamma radiation contributions of standard spectra of known radiation sources by least square resolution of the measured data. This program is based on the Alpha M program developed at Oak Ridge National Laboratory.

In a preferred embodiment for surface formation measurements the detector 12 is a Bicron Corp., Model 3MT3/3 NaI(Tl) scintillation detector. The pre-amplifier 13 is a Video Optics, Inc., Model RPS 2000 battery powered high-voltage power supply and pre-amplifier. The artificial energy source 16 is a 5 $\mu Ci^{133}Ba$ source. The multichannel analyzer 15 is a Nuclear Data, Inc., Model ND6-256, channel analyzer system. The detector 12, pre-amplifier 13 and artificial energy source 16 are contained in a plexiglass housing 19. The field measured natural gamma radiation and artificial radiation from source 16 are applied from detector 10 to multichannel analyzer by way of the coaxial signal connection 20.

In applying the method of the present invention to borehole measurements, the full pulse-height spectra are digitized down hole, and telemetered to the surface where the full spectra are recorded. Potassium, uranium and thorium contents of the subsurface formations are calculated from the spectra using the ND6600 program package as described above.

When calibration is carried out for formations or formation models containing a mixture of two or more of the subject radionuclides K, U, or Th, an additional calculation must be performed using the contribution of those standards reported by the ND6600 program package. For each radionuclide, the contribution of each standard is multiplied by its radionuclide content and summed over all of the standards employed. This sum represents the radioelement content of the unknown formation based on the fitted contributions of standard spectra containing a mixture of potassium, uranium and thorium.

Having now described the present invention in connection with a preferred embodiment, it is to be understood that various modifications and changes may be made without departing from the spirit and scope of the invention as set forth in the appended claims.

I claim:
1. A system for measuring natural gamma radiation comprising:
   a. a sodium iodide scintillation type gamma ray detector for providing an output representative of the total natural gamma radiation spectrum for potassium, uranium and thorium sources, the output of said detector being temperature sensitive,
   b. an artificial source of gamma radiation that is temperature insensitive for producing a stabilized energy peak under variable environmental conditions and does not interfere with the energy peaks from potassium, uranium or thorium, said artificial source of gamma radiation being positioned so as to permit measurement of said artificial gamma radiation by said detector at the same time as the measurement of said natural gamma radiation,
   c. a multichannel analyzer for recording the full energy spectrum output from said detector and for gain stabilizing said full energy spectrum on said stabilized energy peak of said temperature insensitive artificial source of gamma radiation,
   d. means for performing a channel-by-channel least squares fit of the measured full energy spectrum from the multichannel analyzer to at least one standard full energy spectrum recorded from known amounts of potassium, uranium and thorium gamma radiation, and
   e. means for determining the separate potassium, uranium and thorium contents of said measured full energy spectrum from said channel-by-channel least squares fit.

2. The system of claim 1 wherein said artificial source of gamma radiation is barium-133.

3. The system of claim 1 further including means for calculating potassium, uranium and thorium concentrations based on recorded standard full energy spectrums containing a known mixture of two or more of said potassium, uranium and thorium concentrations.

4. The system of claim 3 further including means for the steps of:
   a. multiplying said recorded standard full energy spectrums by the known content of potassium, uranium and thorium, and
   b. summing over all of said recorded standard full energy spectrums.

* * * * *